United States Patent
Petitjean et al.

(10) Patent No.: US 10,023,014 B2
(45) Date of Patent: Jul. 17, 2018

(54) BICYCLE TIRE

(71) Applicants: COMPAGNIE GENERALE DES ETABLISSEMENTS MICHELIN, Clermong-Ferrand (FR); MICHELIN RECHERCHE ET TECHNIQUE S.A., Granges-Paccot (CH)

(72) Inventors: Sylvain Petitjean, Clermont Ferrand (FR); Luc Bestgen, Clermont-Ferrand (FR); David Olsommer, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 311 days.

(21) Appl. No.: 14/904,366

(22) PCT Filed: Jul. 10, 2014

(86) PCT No.: PCT/EP2014/064797
§ 371 (c)(1),
(2) Date: Jan. 11, 2016

(87) PCT Pub. No.: WO2015/004225
PCT Pub. Date: Jan. 15, 2015

(65) Prior Publication Data
US 2016/0167448 A1     Jun. 16, 2016

(30) Foreign Application Priority Data

Jul. 12, 2013  (FR) .................................... 13 56856

(51) Int. Cl.
*B60C 13/00*     (2006.01)
*B60C 13/04*     (2006.01)
(Continued)

(52) U.S. Cl.
CPC .............. *B60C 13/02* (2013.01); *B29D 30/58* (2013.01); *B29D 30/72* (2013.01); *B60C 11/00* (2013.01);
(Continued)

(58) Field of Classification Search
CPC ..... B60C 13/00; B60C 13/001; B60C 13/002; B60C 13/003; B60C 13/004; B60C 13/009; B60C 13/02; B60C 13/023; B60C 13/04
See application file for complete search history.

(56) References Cited

U.S. PATENT DOCUMENTS

| | | | |
|---|---|---|---|
| 4,195,705 A | 4/1980 | Resele | |
| 5,165,776 A | 11/1992 | Long-Jen | |
| 2003/0140999 A1* | 7/2003 | Smith | B60C 1/0016 152/524 |

FOREIGN PATENT DOCUMENTS

| | | |
|---|---|---|
| CH | 303 501 | 11/1954 |
| DE | 4011567 | 8/1990 |

(Continued)

*Primary Examiner* — Justin R Fischer
(74) *Attorney, Agent, or Firm* — Cozen O'Connor

(57) ABSTRACT

Bicycle tire (1) comprising a continuous toothing (5) having a substantially radial generatrix (G) with respect to the rotation axis of the tire in the axial direction (YY'), said toothing (5) being positioned circumferentially on an axially outer face (21) of at least one sidewall (2) and comprising an elastomeric material. A retroreflective strip (6) is positioned circumferentially on the sidewall (2), axially on the outside of the axially outer face (21) of the sidewall (2) and radially on the outside of the toothing (5), a strip support (7) is interposed axially between the retroreflective strip (6) and the axially outer face (21) of the sidewall (2), and an axially outer face (71) of the strip support (7), to which the retroreflective strip (6) is applied, forms an angle (A) of at most equal to 30° with the radial direction (ZZ') of the tire.

12 Claims, 2 Drawing Sheets

(51) Int. Cl.
  *B60C 13/02* (2006.01)
  *B29D 30/58* (2006.01)
  *B29D 30/72* (2006.01)
  *B60C 11/00* (2006.01)
  *B60C 15/00* (2006.01)

(52) U.S. Cl.
  CPC ............ *B60C 13/001* (2013.01); *B60C 13/04* (2013.01); *B60C 15/00* (2013.01); *B60C 2200/12* (2013.01)

(56) References Cited

FOREIGN PATENT DOCUMENTS

| | | | |
|---|---|---|---|
| EP | 2 055 507 | | 5/2009 |
| FR | 2 353 406 | | 12/1977 |
| GB | 1390024 | * | 4/1975 |
| JP | H04 121205 | | 4/1992 |
| JP | 4748779 | * | 8/2011 |
| TW | 556684 | * | 10/2003 |

* cited by examiner

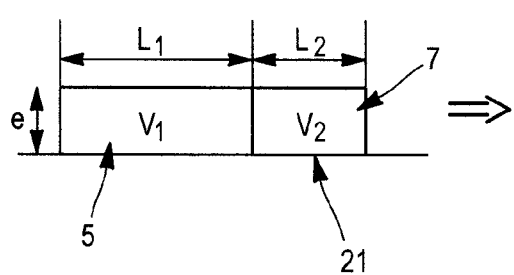 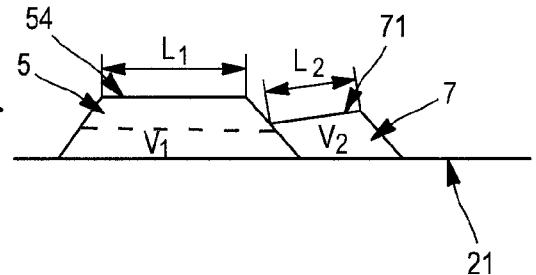
FIG. 3A    FIG. 3B
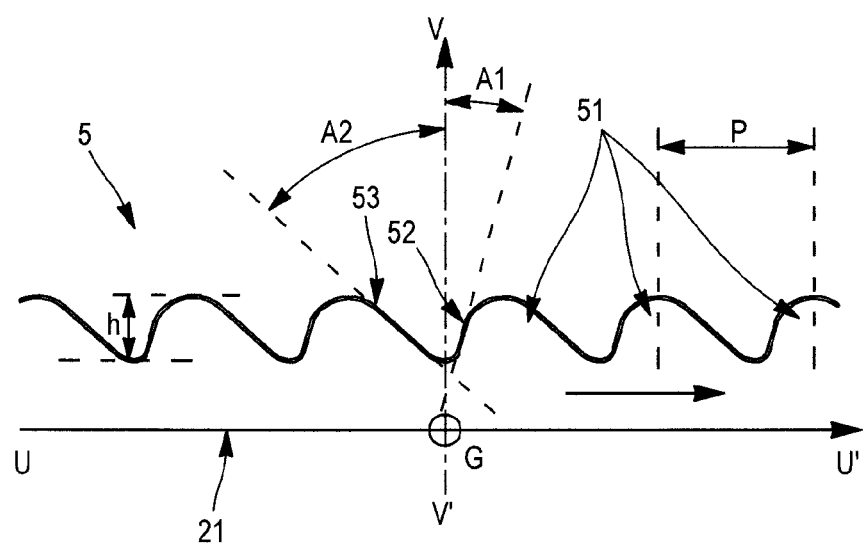
FIG. 4

BICYCLE TIRE

RELATED APPLICATIONS

This is a U.S. National Phase Application under 35 USC 371 of International Application PCT/EP2014/064797 filed on Jul. 10, 2014.

This application claims the priority of French application no. 13/56856 filed Jul. 12, 2013, the entire content of which is hereby incorporated by reference.

FIELD OF THE INVENTION

The present invention relates to a bicycle tire and more particularly to the sidewalls of a bicycle tire.

BACKGROUND OF THE INVENTION

The sidewalls of a tire are the lateral portions of the tire that connect a tread, intended to come into contact with the ground, to two beads, intended to be mounted on a rim.

It is known that a bicycle tire can cooperate with an electrical device, such as an electric generator device, for supplying the lights of the bicycle on which it is mounted.

An electric generator device, for the lights of a bicycle, which is intended to cooperate with a tire has been described in particular in documents DE-4011567-A1 and U.S. Pat. No. 5,165,776. Such a tire comprises a continuous toothing with a radial generatrix, said toothing being positioned circumferentially on a sidewall of the tire and being intended to cooperate with a complementary toothing on a pinion of the electric generator device. The toothing positioned on the tire sidewall is designed to rotate the free pinion of the electric generator device.

It is also known that a bicycle tire must be visually detectable at night in order to meet regulatory requirements.

With regard to the visual detection of an object in a dark environment, it is conventional to use a retroreflective device, which is a passive system based on the application of the optical system known as reflector and is intended to indicate an object at night or in darkness. Retroreflection is the name given to reflection in which the light rays are reflected in a direction similar to that from which they come, this property being maintained in spite of wide variations in the direction of incident rays. A retroreflective device is the name given to a device which, when irradiated directionally, retroreflects a relatively large proportion of the incident rays.

In order to visually detect a tire, retroreflective covering materials are generally incorporated into the sidewalls of the tire, in particular in the case of a tire for a two-wheeled vehicle. Agreement addendum 87 to UN regulation 88 of 20 Mar. 1958 concerning the adoption of uniform conditions of approval and reciprocal recognition of approval of motor vehicle equipment and parts defines the uniform provisions concerning the approval of retroreflective tires for two-wheeled vehicles. Within the meaning of the abovementioned regulation 88, a retroreflective tire is a tire ready for use comprising a retroreflective circle incorporated into each of the sidewalls of the tire. This retroreflective circle is often an adhesive retroreflective strip.

Through the materials and shapes used for a retroreflective device, manufacturers are looking for the best light reflection index, limiting losses of intensity through diffusion or absorption into the material. The basic materials are varied and adapted to the various uses. By way of example and in a non-exhaustive manner, the marketplace includes adhesive tapes, technical fabrics, paints, and coating products based on glass microbeads acting as reflective pigment. In the case of a bicycle tire, an adhesive retroreflective strip is frequently used.

Therefore, in order to fulfil the two above-described functions of cooperation with an electrical device and visual detection, respectively, it is necessary to be able to position, on a tire sidewall with a limited section height, both a continuous toothing and a retroreflective strip, while ensuring that the corresponding functions are correctly fulfilled.

SUMMARY OF THE INVENTION

One object of the invention is to combine, on at least one sidewall of a bicycle tire, a toothing having a substantially radial generatrix, said toothing being positioned circumferentially on the sidewall of the tire and being intended to cooperate with a complementary toothing on an electrical device for a bicycle, and a retroreflective strip for visually detecting the bicycle in the dark.

To this end, one aspect of the invention is directed to a bicycle tire comprising:

two sidewalls connecting a tread to two beads, a continuous toothing having a substantially radial generatrix with respect to the rotation axis of the tire in the axial direction, said toothing being positioned circumferentially on an axially outer face of at least one sidewall and comprising an elastomeric material, a retroreflective strip being positioned circumferentially on the sidewall, axially on the outside of the axially outer face of the sidewall and radially on the outside of the toothing, a strip support being interposed axially between the retroreflective strip and the axially outer face of the sidewall, and an axially outer face of the strip support, to which the retroreflective strip is applied, forming an angle of at most equal to 30° with the radial direction of the tire.

In the following text, the radial direction denotes the direction perpendicular to the rotation axis of the tire, the axial direction denotes the direction of the rotation axis of the tire and the circumferential direction denotes the direction tangential to the running circumference of the tire. The expressions "radially inner" and "radially outer" mean "closer, in the radial direction, to the rotation axis of the tire" and "further away, in the radial direction, from the rotation axis of the tire", respectively. The expressions "axially inner" and "axially outer" mean "closer, in the axial direction, to the equatorial plane of the tire" and "further away, in the axial direction, from the equatorial plane of the tire", respectively, the equatorial plane of the tire being the plane that passes through the middle of the tread and is perpendicular to the rotation axis of the tire.

A continuous toothing is a juxtaposition of teeth, geometrically defined by a generatrix. A substantially radial generatrix forms a small angle with the radial direction of the tire. More specifically, a substantially radial generatrix forms an angle of at most equal to 45° with the direction that is tangential to the axially outer face of the sidewall and situated in a meridian or radial plane of the tire perpendicular to the rotation axis of the tire.

Moreover, this toothing is positioned circumferentially on an axially outer face of at least one sidewall of the tire, that is to say in the circumferential direction.

The toothing comprises an elastomeric material, which is frequently the only material of which the toothing consists. However, the elastomeric material can be used in combination with a textile material, such as an aliphatic polyamide or nylon fabric applied to the axially outer face of the toothing.

According to an embodiment of the invention, a retroreflective strip is positioned circumferentially on the sidewall, axially on the outside of the axially outer face of the sidewall and radially on the outside of the toothing. In other words, the retroreflective strip is positioned parallel to the toothing along the portion of sidewall that is not occupied by the toothing. Generally, but not exclusively, the toothing is positioned in the radially inner portion of the sidewall and the retroreflective strip is positioned in the radially outer portion of the sidewall.

Also according to an embodiment of the invention, a strip support is interposed axially between the retroreflective strip and the axially outer face of the sidewall. Therefore, the retroreflective strip is axially offset, that is to say in relief, with respect to the axially outer face of the sidewall. This allows the retroreflective strip not to be in the shadow cast by the toothing and therefore to be reached by light rays.

Finally, an axially outer face of the strip support, to which the retroreflective strip is applied, forms an angle of at most equal to 30° with the radial direction of the tire. A value of the inclination angle of the axially outer face of the strip support at an angle of at most equal to 30° with respect to the radial direction of the tire ensures the retroreflection from the retroreflective strip.

According to a preferred embodiment, the axially outer face of the strip support forms an angle of at most equal to 20°, preferably at most equal to 10°, with the radial direction of the tire. This range of values of the inclination angle of the axially outer face of the strip support ensures that the retroreflection from the strip is optimized.

It is advantageous for the radial distance d between the radially outermost point of the strip support and the radially outermost equatorial point of the tread in the equatorial plane (XZ) of the tire to be at least equal to 0.37 times the section width S.

This positioning characteristic of the strip support in the radial direction ensures a lack of contact between the retroreflective strip and the ground when the tire runs at a camber angle that can reach 40°. The camber angle is the angle formed by the equatorial plane with the perpendicular to the ground. Under these conditions, the retroreflective strip, which is most often formed by the combination of a rubber coating, aluminium paint and glass beads, does not rub on the ground. There is thus no abrasion of the retroreflective strip or a risk of losing its retroreflective capability.

The strip support advantageously comprises an elastomeric material, which is a material that is easy to fix to the sidewall, itself made of elastomeric material.

The strip support preferably comprises an elastomeric material identical to the elastomeric material of the toothing. The fact that these materials are identical makes it possible to simultaneously manufacture the toothing and the retroreflective strip by placing a single elastomeric material on the axially outer face of the sidewall.

Preferably again, the toothing having a volume $V_1$, a width $L_1$ and a centre of gravity ($G_1$) positioned at a radial distance $R_1$ from the rotation axis of the tire, and the strip support having a volume $V_2$, a width $L_2$ and a centre of gravity ($G_2$) positioned at a radial distance $R_2$ from the rotation axis of the tire, the ratio $V_1*R_1/L_1$ of the product of the volume $V_1$ multiplied by the radial distance $R_1$ to the width $L_1$ of the toothing is equal to the ratio $V_2*R_2/L_2$ of the product of the volume $V_2$ multiplied by the radial distance $R_2$ to the width $L_2$ of the strip support.

When the radial distances $R_1$ and $R_2$ are similar, the above relationship can be simplified: the ratio $V_1/L_1$ of the volume $V_1$ to the width $L_1$ of the toothing is then equal to the ratio $V_2/L_2$ of the volume $V_2$ to the width $L_2$ of the strip support.

The equality of these geometric ratios defines the constant thickness of the rectangular-section strip of unvulcanized elastomeric material to be placed on the sidewall of the tire prior to the step of curing and moulding the tire. This constant thickness of the unvulcanized elastomeric material makes it possible to simultaneously manufacture the toothing and the strip support. A constant thickness of the unvulcanized elastomeric material, implying a flat surface, also makes it possible to easily place the retroreflective strip on the strip support and, if need be, to easily place a textile material, for example of the fabric type, on the toothing, prior to the step of curing and moulding the tire.

Another aspect of the invention relates to a method for manufacturing a bicycle tire according to the preferred embodiment described above. This manufacturing method comprises a step of placing, prior to curing, an element of unvulcanized elastomeric material, generally in the form of a rectangular-section strip, of constant thickness e on the axially outer face of at least one sidewall, this being intended to form, after curing, a toothing and a strip support. The constant thickness e is equal to the ratio $V_1*R_1/L_1$ of the product of the volume $V_1$ multiplied by the radial distance $R_1$ to the width $L_1$ of the toothing and equal to the ratio $V_2*R_2/L_2$ of the product of the volume $V_2$ multiplied by the radial distance $R_2$ to the width $L_2$ of the strip support.

According to a preferred embodiment, for a bicycle tire having a section width S and comprising a toothing comprising teeth, the teeth having a height h and a length l and comprising an elastomeric material having a Shore A hardness, the height h of the teeth is at least equal to 0.6 mm and at most equal to 3 mm, the length l of the teeth is at least equal to 0.15 times and at most equal to 0.50 times the section width S of the tire, and the elastomeric material of the teeth has a Shore A hardness of at least equal to 55 and at most equal to 85.

In this preferred embodiment, the toothing is particularly designed to cooperate with an electrical device of the electric assist type, which is mounted on the bicycle and is able to rotate at least one wheel of the bicycle with the aid of a drive torque generated by a drive motor.

The external geometry of a tire is, in particular, characterized by the section width S of the tire, which is the axial distance between the axially outermost points of the sidewalls of the tire. An axial distance is a distance measured parallel to the rotation axis of the tire. The axially outermost points are the two furthest-apart points, in the axial direction, of the equatorial plane of the tire. This axial distance is measured on a tire mounted on its rim and inflated to its service pressure, within the meaning of the standards of the European Tire and Rim Technical Organization or ETRTO.

The respective ranges of values for the height h and the length l of the teeth imply that the contact surface between a tooth of the toothing of the tire and a tooth of the complementary toothing of the pinion of the electric assist device, with which the toothing of the tire is intended to cooperate, is in a range of values making it possible to transmit the torque generated by the electric assist device to the wheel. These ranges of values for the height h and the length l take into account size constraints for positioning the toothing on the sidewall of the tire.

Also according to this preferred embodiment, the elastomeric material of the teeth has a Shore A hardness of at least equal to 55 and at most equal to 85. Shore A hardness is a mechanical characteristic of an elastomeric material measured in accordance with standard DIN 53505.

A minimum Shore A hardness value ensures minimal flexural rigidity, about the generatrix of the toothing, for transmitting the torque generated by the electric assist device to the wheel, for a given tooth length and height. A maximum Shore A hardness value limits the impact of the toothing on the rigidity of the sidewall of the tire, in the circumferential direction, and consequently on the comfort of the cyclist.

The combination of the respective ranges of values for the height of the teeth, the length of the teeth and the Shore A hardness of the elastomeric material of which the teeth consist makes it possible to transmit to the wheel a drive torque generated by the electric assist device that can reach a value of 50 Nm or even 60 Nm.

According to a preferred variant of this preferred embodiment, the toothing comprises a textile material, preferably of the aliphatic polyamide type.

The textile material is preferably an aliphatic polyamide or nylon, which is a material commonly used in the tires field on account of its cost and its compatibility with elastomeric materials.

The textile material is most often in the form of a fabric. However, it can also be formed by dispersed reinforcements.

The presence of a textile material, in addition to the elastomeric material, makes it possible to improve the abrasion resistance of the toothing, resulting from meshing cycles. It also makes it possible to reduce the noise generated by way of a damping effect of the textile material. Finally, in terms of manufacture, a textile material having orthotropic elasticity follows the deformations during the moulding of the shape of the tooth, in the course of the shaping of the tire during the curing thereof.

Even more preferably, the toothing comprises, axially on the outside of the elastomeric material, a textile material, preferably of the aliphatic polyamide type.

A textile material, positioned on the outside of the elastomeric material, has the advantage of being easy to fit. Moreover, it makes it possible to increase the efficiency of the transmission by affording better slip between the toothing of the tire and the complementary toothing, thereby reducing frictional losses by way of a lubricating effect.

BRIEF DESCRIPTION OF THE DRAWINGS

The features and other advantages of the invention will be better understood with the aid of the appended schematic figures which are not shown to scale, in which:

FIGS. 3A and 3B are views in cross section of a combination of a toothing and a strip support according to an embodiment of the invention, before curing and after curing, respectively, FIG. 4 is a view in cross section of a toothing according to an embodiment of the invention, in a section plane perpendicular to the generatrix of the toothing.

DETAILED DESCRIPTION OF THE DRAWINGS

Figure 1:
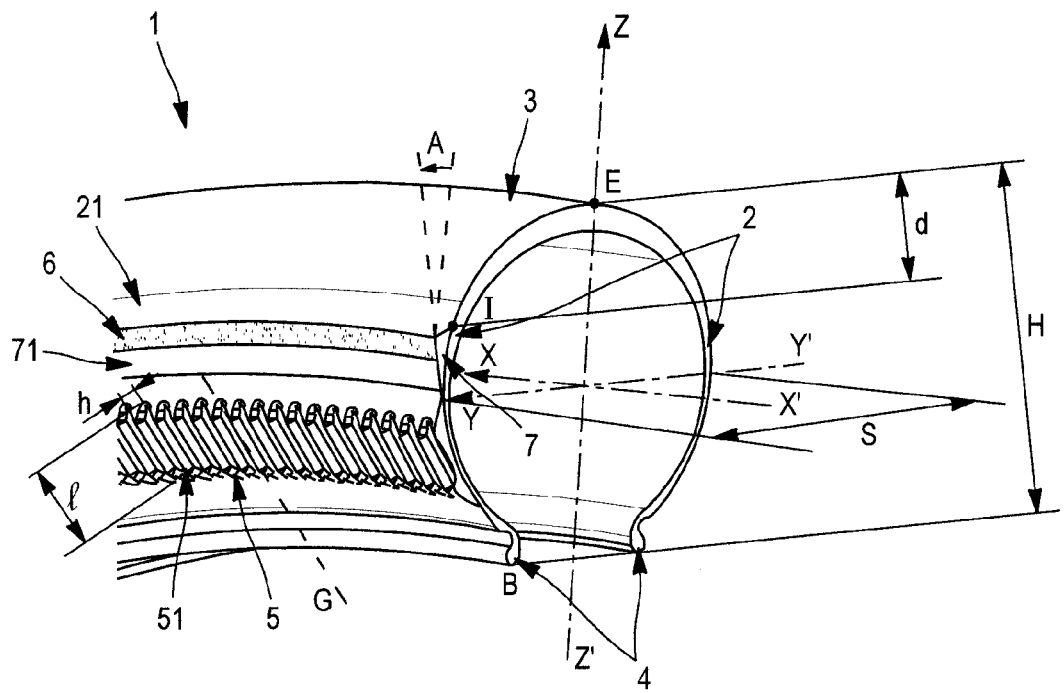
FIG. 1 shows a perspective view of a bicycle tire portion comprising a combination of a toothing and a retroreflective strip according to an embodiment of the invention.

FIG. 1 shows a perspective view of a tire portion 1 comprising the combination of a toothing 5 and a retroreflective strip 6 according to the invention. The tire 1 comprises two sidewalls 2 connecting a tread 3, intended to come into contact with the ground (not shown), to two beads 4 that are intended to come into contact with a mounting rim (not shown). The directions XX', YY' and ZZ' respectively denote the circumferential direction, tangential to the tread 3 of the tire and oriented in the running direction of the tire, the axial direction, parallel to the rotation axis (not shown) of the tire, and the radial direction, perpendicular to the rotation axis of the tire. The tire 1 has a section width S, measured in the axial direction YY', between the axially outermost points of the axially outer faces 21 of the sidewalls 2. The tire 1 has a section height H, measured in the radial direction ZZ', which is the maximum radial distance between the radially innermost points B of the beads 4 and the equatorial point E of the tread 3 which is the radially outermost point of the tread 3, situated in the equatorial plane XZ of the tire 1. The tire 1 comprises a continuous toothing 5 having a substantially radial generatrix G with respect to the rotation axis of the tire in the axial direction YY', said toothing 5 being positioned circumferentially, in the direction XX', on an axially outer face 21 of at least one sidewall 2. The toothing 5 comprises teeth 51, the teeth 51 having a height h and a length l and comprising an elastomeric material having a Shore A hardness. According to the invention, a retroreflective strip 6 is positioned circumferentially on the sidewall 2, axially on the outside of the axially outer face 21 of the sidewall 2 and radially on the outside of the toothing 5, a strip support 7 is interposed axially between the retroreflective strip 6 and the axially outer face 21 of the sidewall 2, and an axially outer face 71 of the strip support 7, to which the retroreflective strip 6 is applied, forms an angle A of at most equal to 30° with the radial direction ZZ' of the tire. The radially outermost point I of the strip support 7 is situated at a radial distance d from the equatorial point E of the tread 3, at least equal to 0.37 times the section width S.

Figure 2:
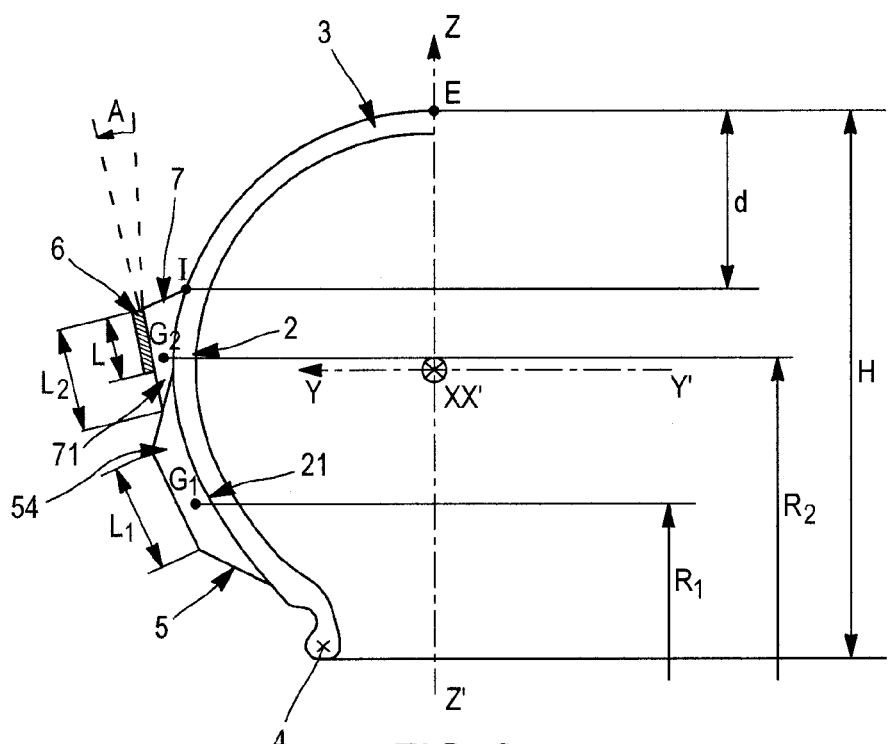
FIG. 2 shows a view of a meridian half section of a tire comprising a combination of a toothing and a retroreflective strip according to an embodiment of the invention.

FIG. 2 is a view of a meridian half section of a tire comprising a combination of a toothing 5 and a retroreflective strip 6 according to the invention. The features of FIG. 2 have mostly been described for FIG. 1. The toothing 5 has an axially outer face 54 of width $L_1$, the axially outer face 54 being the theoretical surface passing through the tops of the teeth 51 shown in FIG. 4. The centre of gravity ($G_1$) of the toothing 5 is positioned at a radial distance $R_1$ from the rotation axis of the tire. The strip support 7 has an axially outer face 71 of width $L_2$. The centre of gravity ($G_2$) of the strip support 7 is positioned at a radial distance $R_2$ from the rotation axis of the tire. The retroreflective strip 6 of width L is positioned on the axially outer face 71 of the strip support 7 of width $L_2$ greater than the width L. In FIG. 2, the retroreflective strip 6 is positioned on the radially outer portion of the axially outer face 71, but it could be positioned on any portion of said axially outer face 71. Moreover, the axially outer face 54 of the toothing 5 can be covered with a textile material, for example an aliphatic polyamide fabric (not shown).

FIGS. 3A and 3B respectively show views in cross section of the combination of a toothing 5 and a strip support 7 according to the invention, before curing and after curing, respectively. Before curing, FIG. 3A shows that the element before curing, intended, after curing and moulding, to become the combination of the toothing 5 and the strip support 7, is a strip of unvulcanized elastomeric material of thickness e, of width $L_1+L_2$ and of volume $V_1+V_2$, positioned on the axially outer face 21 of the sidewall 2. This element either consists of a single elastomeric material or consists of the superposition of an elastomeric material and a textile material, most often of the fabric type. After curing and moulding, the combination of the toothing 5 and the strip support 7 according to the invention is obtained, in FIG. 3B, their axially outer faces 54 and 71, respectively, having widths $L_1$ and $L_2$, respectively. The volumes $V_1$ and $V_2$ are the respective volumes of the toothing 5 and of the strip support 7. The volume $V_1$ of the toothing 5 is a real volume of the elastomeric material, which does not take into account the spaces between the teeth.

FIG. 4 is a view in cross section of a toothing 5 according to the invention, in a section plane UV perpendicular to the generatrix G of the toothing 5. The toothing 5 consists of a juxtaposition of teeth 51 spaced apart at a pitch p. The pitch p is the distance measured between the tops of two consecutive teeth 51 in the direction UU' parallel to the axially outer face 21 of the sidewall 2. Each tooth 51 has a height h, measured between the base and the top of the tooth 51, in the direction VV' perpendicular to the axially outer face 21 of the sidewall 2. Each tooth 51 comprises a driving face 52 and a non-driving face 53. In the embodiment shown in FIG. 4, the opening angle $A_1$ of the driving face 52, with respect to the direction VV', is less than the opening angle $A_2$ of the non-driving face 53, with respect to the direction VV'. FIG. 4 illustrates teeth having rectilinear driving faces and non-driving faces. In the case of a curvilinear face, the above-described opening angle should be measured between the tangent to the point of the curvilinear face corresponding to the tooth half height and the direction VV'.

This invention has been devised more particularly for a bicycle tire of the size 37-622, one sidewall of which comprises a toothing having a pitch p equal to 2.3 mm and having teeth having a length l equal to 9.5 mm and a height h equal to 0.94 mm. A retroreflective strip having a width equal to 5 mm is positioned circumferentially on a strip support, the axially outer face of which forms an angle of 11° with respect to the radial direction. The element of unvulcanized elastomeric material, as shown in FIG. 5, has a constant thickness equal to 1.1 mm and widths $L_1$ and $L_2$ equal to 17 mm and 7 mm, respectively. It has been found that the meshing and retroreflection functions are ensured satisfactorily with this type of design.

This invention encompasses any type of toothed-section geometry (tooth profile, generatrix profile), any type of elastomeric material on its own or in combination with a textile material, and more generally any element in relief with respect to the sidewall, the combination of which with a retroreflective strip is desired.

The invention claimed is:

1. A bicycle tire comprising:
   two sidewalls connecting a tread to two beads; and
   a continuous toothing having a substantially radial generatrix with respect to the rotation axis of the tire in the axial direction, said toothing being positioned circumferentially on an axially outer face of at least one sidewall and comprising an elastomeric material,
   wherein a continuous retroreflective strip is positioned circumferentially on the sidewall, axially on the outside of the axially outer face of the sidewall and radially on the outside of the toothing, a strip support being interposed axially between the retroreflective strip and the axially outer face of the sidewall, and wherein an axially outer face of the strip support, to which the retroreflective strip is applied, is flat and inclined with respect to the radial direction of the tire so as to form a non-zero inclination angle with the radial direction of the tire, and inclined so as not to be parallel with the outer face of the sidewall at the radial position on the sidewall at which the retroreflective strip is applied.

2. The bicycle tire according to claim 1, wherein the inclination formed by the axially outer face of the strip support is at most equal to 20° with the radial direction of the tire.

3. The bicycle tire according to claim 1, wherein the radial distance d between the radially outermost point of the strip support and the radially outermost equatorial point of the tread in the equatorial plane of the tire is at least equal to 0.37 times the section width S.

4. The bicycle tire according to claim 1, wherein the strip support comprises an elastomeric material.

5. The bicycle tire according to claim 1, wherein the strip support comprises an elastomeric material identical to the elastomeric material of the toothing.

6. The bicycle tire according to claim 1, wherein the toothing comprises a textile material.

7. The bicycle tire according to claim 1, wherein the axially outer face of the strip support forms an angle of at most equal to 10° with the radial direction of the tire.

8. A bicycle tire according to claim 1, wherein the toothing comprises a textile material of the aliphatic polyamide type.

9. The bicycle tire according to claim 1, wherein the inclination formed by the axially outer face of the strip support is at most equal to 30° with the radial direction of the tire.

10. A bicycle tire comprising:
    two sidewalls connecting a tread to two beads; and
    a continuous toothing having a substantially radial generatrix with respect to the rotation axis of the tire in the axial direction, said toothing being positioned circumferentially on an axially outer face of at least one sidewall and comprising an elastomeric material,
    wherein a retroreflective strip is positioned circumferentially on the sidewall, axially on the outside of the axially outer face of the sidewall and radially on the outside of the toothing, a strip support being interposed axially between the retroreflective strip and the axially outer face of the sidewall, and wherein an axially outer face of the strip support, to which the retroreflective strip is applied, forms an angle of at most equal to 30° with the radial direction of the tire, and
    wherein the toothing has a volume $V_1$, a width $L_1$ and a centre of gravity positioned at a radial distance $R_1$ from the rotation axis of the tire, and the strip support having a volume $V_2$, a width $L_2$ and a centre of gravity positioned at a radial distance $R_2$ from the rotation axis of the tire, wherein the ratio $V_1*R_1/L_1$ of the product of the volume $V_1$ multiplied by the radial distance $R_1$ to the width $L_1$ of the toothing is equal to the ratio $V_2*R_2/L_2$ of the product of the volume $V_2$ multiplied by the radial distance $R_2$ to the width $L_2$ of the strip support.

11. A method for manufacturing a bicycle tire according to claim 10, comprising a step of placing, prior to curing, an element of elastomeric material of constant thickness e on the axially outer face of at least one sidewall, this being intended to form, after curing, a toothing and a strip support, the constant thickness e being equal to the ratio $V_1*R_1/L_1$ of the product of the volume $V_1$ multiplied by the radial distance $R_1$ to the width $L_1$ of the toothing and equal to the ratio $V_2*R_2/L_2$ of the product of the volume $V_2$ multiplied by the radial distance $R_2$ to the width $L_2$ of the strip support.

12. A bicycle tire comprising:
    two sidewalls connecting a tread to two beads; and
    a continuous toothing having a substantially radial generatrix with respect to the rotation axis of the tire in the axial direction, said toothing being positioned circumferentially on an axially outer face of at least one sidewall and comprising an elastomeric material, wherein a retroreflective strip is positioned circumferentially on the sidewall, axially on the outside of the axially outer face of the sidewall and radially on the outside of the toothing, a strip support being interposed axially between the retroreflective strip and the axially outer face of the sidewall, and wherein an axially outer face of the strip support, to which the retroreflective strip is applied, forms an angle of at most equal to 30° with the radial direction of the tire, the bicycle tire having a section width S and comprising a toothing comprising teeth, the teeth having a height h and a length $L_1$ and comprising an elastomeric material having a Shore A hardness, wherein the height h of the teeth is at least equal to 0.6 mm and at most equal to 3 mm, the length $L_1$ of the teeth is at least equal to 0.15 times and at most equal to 0.50 times the section width S of the tire, and the elastomeric material of the teeth has a Shore A hardness of at least equal to 55 and at most equal to 85.

* * * * *